UNITED STATES PATENT OFFICE.

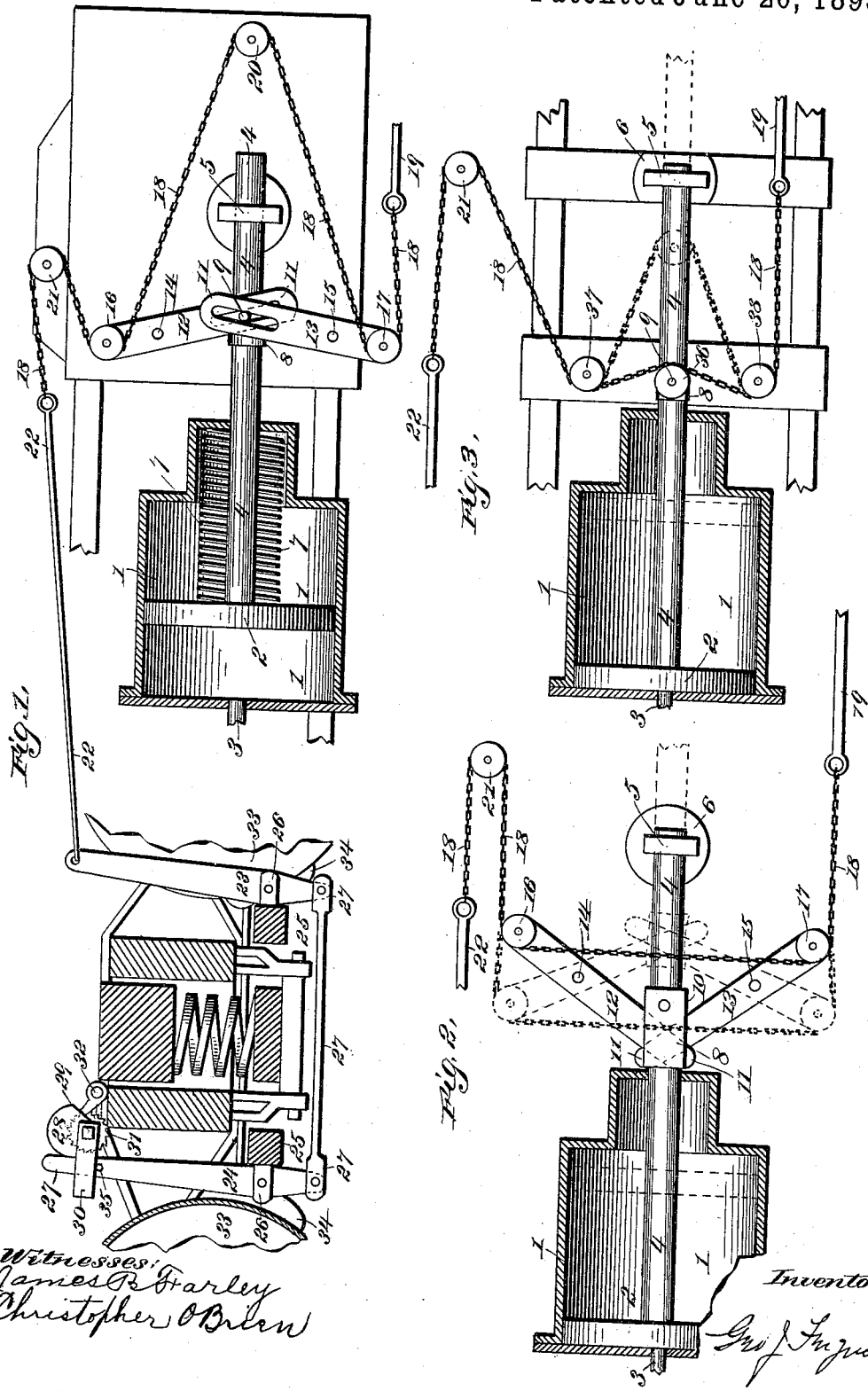

GEORGE J. FERGUSON, OF GREENVILLE, TEXAS.

CAR-BRAKE.

SPECIFICATION forming part of Letters Patent No. 499,725, dated June 20, 1893.

Application filed March 3, 1891. Serial No. 383,651. (No model.)

*To all whom it may concern:*

Be it known that I, GEORGE JONES FERGUSON, residing at Greenville, in the county of Hunt and State of Texas, have invented a new and useful Combined Automatic Slack-Taker and Equalizer for Car-Brakes, of which the following is a specification.

My invention relates to improvements in the application of power to car brakes, whereby the slack is quickly and automatically absorbed, and a powerful leverage is secured, and a perfect equalization of the leverage at each end of the car is obtained, and the convenient and safe adjustment of the brakes in regard to the wheels is effected, and any particular alignment of the brake cylinder in regard to the car body is avoided as the cylinder may be placed across the car body or at any angle desired to secure convenience of application.

Heretofore in the application of power to car-brakes the piston operating in the brake cylinder has to travel a considerable distance to simply overcome the necessary slack between the brake shoes and the wheels and consequently when the shoes become slightly worn the space between them and the wheels is greatly increased, and the traverse of the piston exceeds the length of the brake cylinder and a total failure to apply the brakes ensues. To overcome this defect I provide the mechanism herein shown and described. In the preliminary traverse of the piston the necessary slack between the brake shoes and the wheels is quickly absorbed by the levers, whose movement increases the leverage the further the piston travels, and a very slight movement of the piston absorbs the most excessive slack and at the same time equalizes the leverage on each brake lever, and also avoids the complicated systems of levers and rods necessary in present practice.

In the accompanying drawings Figure 1 is a vertical sectional view of a car truck equipped with what is generally called an inside brake, showing how my appliances are attached thereto, and to the right of the car truck I show a horizontal view of a brake cylinder it being cut in half to show the piston therein. This view also shows how the levers are pivoted to the car body and being loosely connected to the piston stem, all parts being in applied position. Fig. 2 is a horizontal section of a brake cylinder and the levers slightly modified, the full lines showing relieved position and the broken lines showing the applied position. Fig. 3 is a horizontal section of a brake cylinder and shows a modification whereby the levers may be omitted the full lines showing the relieved position while the broken lines show the applied position.

This invention is a simpler form of a similar appliance to that shown in my application for patent filed February 9, 1891, Serial No. 380,862, the principle being nearly identical but the mechanical construction being widely different and it is destined to furnish a device whereby the motive power imparted to the piston by pressure in the brake cylinder is applied to two separate levers which are pivoted to the car body and are loosely connected in a crosshead on the piston stem the preferable construction being shown in Fig. 2, the outer ends of these levers having pulleys or sheaves pivoted thereon and one or more pulleys are pivoted to the car body and may be arranged as shown in either Fig. 1 or 2. These levers are not directly connected to the brake connections, but are indirectly attached to a chain which is wound around the several pulleys or sheaves and is respectively attached to brake rods which extend to each end of the car brake and are secured to the pull lever thereof as shown in Fig. 1. It will be understood that should the brake beams be hung on the outside of the wheels this rod will be connected to the outside lever instead of the inside lever as shown in Fig. 1, enabling me to dispense with the complicated system of intermediate levers and rods necessary in present practice. And I also secure the further advantage of a perfect equalization of the strain on each pull lever as the chain is free to automatically adjust itself according as the slack in the connections is absorbed, so that fourfold the amount of slack is absorbed by the appliance shown in Figs. 1 and 3 and double in that shown in Fig. 2 than is absorbed by devices in present service. I accomplish the preservation of the leverage by the increase in length of the levers after they pass their pivoted position and this leverage may be increased or diminished by simply moving the pivots farther from or nearer to the piston.

It is desirable in perfect brake practice that the brake shoes on each car truck should be practically the same distance from the wheels and on account of irregularity of wear in the brake shoes or from the replacing of a portion of the worn shoes with new shoes this distance between the shoes and the wheels is either increased or diminished. Consequently it is necessary to have a device on each truck to regulate the unavoidable difference of space, to assist the other devices to accomplish this end. I accomplish this by journaling a shaft on the truck frame which shaft may extend to either or both sides of the truck frame, and is adapted to be rotated by a wrench, or crank-handle, which is applied to the angular end or extension which projects beyond the truck frame. On this shaft is secured a ratchet which is retained by a suitable pawl, attached to the truck frame partially shown in broken lines in Fig. 1 and on this shaft I also secure a cam which engages the dead lever of the brake so that by turning the shaft the increased throw of the cam will move the dead lever farther from the truck frame, and thereby take up the slack by moving the brake beams toward the wheels. The object in extending the shaft to the outside of the truck frame is to enable the car-inspector to adjust the slack conveniently and also to avoid the necessity of having to crawl under the car to effect this result as is the case in present practice and which is very dangerous as well as very inconvenient, and besides it being necessary to often crawl out from under the car several times to see if the slack had been properly adjusted.

In the drawings similar numerals refer to similar parts throughout the several views.

I will now describe my invention in detail.

The brake cylinder 1 is of ordinary construction and is secured to the under side of the car body at any angle desired, and within cylinder 1 is a movable piston head 2 capable of being actuated by pressure entering at opening 3, and to this piston head 2, a piston stem 4, is attached and extends through said cylinder and projects beyond a sufficient distance to be guided at 5, on casting 6 which is secured to the car body. The cylinder contains a relief spring 7 to insure the return of the piston. Intermediate between this guide 5 and the cylinder 1 the piston stem 4 is provided with a crosshead 8 on which is secured a pin 9, the levers 12, and 13, being slotted at 11 so as to embrace this pin 9, and permit its free movement in the slots as the pin 9 will slide in the slots when the piston is operated, as shown in Fig. 1, while in Fig. 2 the crosshead 8 is modified by having a slot 10 in which the ends 11, of the levers 12, and 13, operate. These levers 12, and 13, are pivoted at 14 and 15 to the car-body and on their outer ends are pivoted pulleys or sheaves 16 and 17. A chain 18 is attached to rod 19, and passes around one side of the pulley 17 on lever 13, thence to the pulley 20 which is pivoted and secured to the car body. The chain 18 is then passed around one side of the pulley 16 on the lever 12 thence to and around one side of the pulley 21 which is pivoted and secured to the car body and is placed in position to secure a direct pull on the brake lever 23, the chain 18 being attached to the rod 22 which extends to the pull lever 23 on one car truck, while the rod 19 extends to the pull lever on the opposite car-truck.

In the construction shown in Fig. 2 the pulleys 20 may be dispensed with but in that case only double the traverse of the piston in slack would be absorbed, while by using the pulley 20 as shown in Fig. 1 a fourfold amount of slack is absorbed by the same traverse of the piston.

In my application for patent filed February 9, 1891, Serial No. 380,862, I show my appliances attached to a brake hung on outside of the wheels, while in the present instance I show a connection to a brake hung inside of the wheels. The pull lever 23 and the dead lever 24 may be arranged in any of the common forms now in practical service, viz., attached and pivoted to brake beams 25 by forks 26, or any equivalent device. The lower end of the pull lever 23 is pivoted to the horizontal rod 27 which in common practice is termed the bottom connecting rod. This rod 27 extends to the lower end of the dead lever 24 to which it is pivoted this dead lever 24 being pivoted in the fork 26 attached to brake beam 25, and extends above the fork 26 a considerable distance and at its upper end 27 I journal a cam 28 on a shaft 29. This shaft 29 passes through the cam 28 and also through a loop 30 which loop 30 extends around the dead lever 24 loosely but fits the cam 28 very tight on both sides. This loop 30 prevents the lever 24 from being disengaged from the cam 28. The loop 30 simply limits the lateral movement of the lever 24, the cam 28 alone limiting the traverse of the lever, but the loop 30 also performs another function, viz. it being fitted very tight to the cam 28 and spring thereon so as to prevent the cam from moving except force is applied to turn the shaft 29. The loop is held up by pin 35 and pivoted on the shaft 29, and on the same shaft is secured a ratchet 31 shown partially in broken lines in Fig. 1 this ratchet 31 being held to its position by the pawl 32. By turning the cam 28 toward the lever 24, the lever 24 and the brake beams 25 are forced toward the wheels 33 thereby absorbing the slack between the shoes 34 and the wheels 33. This device I designate the brake adjuster and it is designed to particularly adjust the distance between the brake shoes and the wheels on each truck independently of the other truck.

It will be noted that in this invention the brake cylinder can be placed at any angle either across or in alignment with the car body. This is a very important improvement as in the case of locomotive tenders, and cars having cellars under the body the space for the brake cylinder is very limited and a brake appliance capable of being placed in any position or direction is a valuable improvement. I also desire it understood that I can connect my appliances to any arrangement of brake connections now in use.

In Fig. 3 I show a modification, whereby the levers 12 and 13 may be omitted by pivoting a pulley 36 on the crosshead 8 of the piston on pin 9, and by securing and pivoting two pulleys 37 and 38 on each side of the piston to the car body and using the pulley 21. The chain 18 is passed between the pulleys 36, 37, and 38, as shown in Fig. 3, the broken lines showing position of the pulley 36 when the brakes are applied. This is a very simple form of my invention and accomplishes all of the features except the increase of leverage. It absorbs slack to the amount of four times the traverse of the piston. It is a perfect equalizer, and is self adjusting.

What I claim as new, and desire to secure by Letters Patent, is—

1. The combination of levers, pivoted to the car body and loosely engaged by the movable piston, said levers having pulleys or sheaves in their outer ends, a pulley or pulleys attached to the car body, a chain passing through and between said pulleys, said chain being attached to opposite ends of a car-brake, substantially as set forth.

2. The combination of pulleys attached to the car body and pulleys operated by the piston, a chain interwoven between said pulleys whereby the outward movement of the piston absorbs an excess of slack, perfectly equalizes the leverage, and simultaneously applies the brake at opposite ends of a car substantially as set forth.

3. The combination, of levers pivoted to the car body and loosely engaged by the movable piston, said levers having pulleys or sheaves, in their outer ends a pulley or pulleys attached to the car body, a chain passing through and between said pulleys, and being attached to opposite ends of a car brake, whereby the further traverse of the piston increases the leverage, substantially as set forth.

4. The combination, of levers pivoted to the car body, a movable piston engaging said levers, a chain connected to opposite ends of a brake mechanism, and engaging the outer ends of the levers, and passing around the stationary pulleys, whereby the chain is controlled by the levers to secure the application of the brakes regardless of difference in the amount of slack at opposite ends of the brake mechanism substantially as set forth.

5. The combination, of a connection from a power brake to the pull lever, a bottom brake connecting rod between the pull lever and the dead lever a shaft journaled to the truck frame, a cam secured on said shaft, a loop embracing the cam and the dead lever, a ratchet and pawl, and means whereby the shaft can be rotated from the outside of the truck frame substantially as set forth.

6. The combination of a brake-cylinder and a movable piston therein, a slotted cross-head embracing the ends of the pivoted operating levers, a chain connecting the levers to opposite ends of a brake mechanism, substantially as set forth.

GEO. J. FERGUSON.

Witnesses:
E. J. BOUCHARD,
C. W. JAMINET.